United States Patent
Miglani et al.

(10) Patent No.: US 11,907,151 B2
(45) Date of Patent: Feb. 20, 2024

(54) RECONFIGURABLE PERIPHERAL COMPONENT INTERCONNECT EXPRESS (PCIE) DATA PATH TRANSPORT TO REMOTE COMPUTING ASSETS

(71) Applicant: Drut Technologies Inc., Nashua, NH (US)

(72) Inventors: Jitender Miglani, Hollis, NH (US); Will Ferry, Bloomsburg, PA (US); Dileep Desai, San Jose, CA (US)

(73) Assignee: Drut Technologies Inc., Nashua, NH (US)

( * ) Notice: Subject to any disclaimer, the term of this patent is extended or adjusted under 35 U.S.C. 154(b) by 181 days.

(21) Appl. No.: 17/524,641

(22) Filed: Nov. 11, 2021

(65) Prior Publication Data
US 2023/0144056 A1  May 11, 2023

(51) Int. Cl.
*G06F 13/42* (2006.01)
*G06F 13/40* (2006.01)
*G02B 6/35* (2006.01)

(52) U.S. Cl.
CPC ....... *G06F 13/4027* (2013.01); *G02B 6/3518* (2013.01); *G02B 6/3546* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 10,552,227 B2 | 2/2020 | Altstaetter et al. | |
| 10,802,887 B2 | 10/2020 | Altstaetter et al. | |
| 11,424,905 B1* | 8/2022 | Musoll | H04L 7/0041 |
| 2017/0116093 A1* | 4/2017 | Arroyo | G06F 11/2005 |
| 2018/0285227 A1* | 10/2018 | Sharma | H04L 43/0823 |
| 2019/0205270 A1* | 7/2019 | Leung | G06F 13/1678 |
| 2021/0311895 A1* | 10/2021 | Das Sharma | G06F 13/4081 |

* cited by examiner

Primary Examiner — Henry Tsai
Assistant Examiner — Dean Phan
(74) Attorney, Agent, or Firm — SoCal IP Law Group LLP; Angelo J. Gaz; Steven C. Sereboff

(57) ABSTRACT

Described are methods for configuring computing system for and computing systems for PCIe communication between remote computing assets. The system uses a fabric interface device configured to receive multi-lane serial PCIe data from functional elements of a computing asset through a multi-lane PCIe bus, and to transparently extend the multi-lane PCIe bus by converting the multi-lane PCIe data into a retimed parallel version of the PCIe multi-lane data to be sent on bidirectional data communication paths. The fabric interface device is also configured so that the multi-lane PCIe bus can have a first number of lanes and the bidirectional data communication paths can have a different second number of lanes.

20 Claims, 9 Drawing Sheets

RECONFIGURABLE PERIPHERAL COMPONENT INTERCONNECT EXPRESS (PCIE) DATA PATH TRANSPORT TO REMOTE COMPUTING ASSETS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to cloud computing data center architecture and more particularly to reconfigurable compute nodes within a data center.

Description of the Related Art

Cloud computing is an information processing architecture in which internal or external users access shared pools of computing resources such as servers, storage, applications, and services. With cloud computing, users run applications (which may be provided by the cloud provider, the customer of the cloud provider, a customer of the customer or the end user) on computing resources in the "cloud", which is to say on remote computing assets within a data center.

Cloud computing data centers include replicated computers that run applications for users. These computers can be referred to as compute nodes, but may also be called servers, blades or boards. Currently, each compute node is a self-contained board, chassis, or other physical module. Typically, multiple compute nodes are housed in a common equipment rack and connected to the world external to the rack though a high-speed network switch.

Now referring to FIG. 1 there is shown a simplified block diagram of an exemplary compute node 100. The compute node 100 is not necessarily representative of the compute nodes in any particular data center, but is illustrative of problems with the current data center architecture.

The exemplary compute node 100 includes two central processing units (CPUs) 110, 111 and eight graphics processing units (GPUs) 130 to 137. The compute node 100 contains memory and other functional elements not shown in FIG. 1. The CPUs 110, 111 are communicatively coupled to each other, and the CPUs 110, 111 are coupled to respective interfaces 150, 151 to the external world. These interfaces are typically high speed Ethernet interfaces for communications using the TCP/IP (transmission control protocol/internet protocol) protocol suite.

The GPUs 130-137 are organized as two banks of four GPUs respectively associated with the two processors 110, 111. Data transfers between the CPUs and GPUs are made over peripheral component interconnect express (PCIe) buses. Since each CPU 110, 111 has limited PCIe bus capacity, respective PCIe switches 120, 121 are used between each CPU 110, 111 and the respective bank of GPUs.

A first problem with this architecture is inflexible compute node configuration. The compute node 100 is ideally suited to run applications that were designed for execution by two CPUs and eight GPUs. However, the fixed configuration (i.e., two CPUs and eight GPUs) of the compute node 100 makes it less suitable for other applications. For example, applications designed for more than eight GPUs would run slowly and inefficiently on the compute node 100. Applications designed for less than eight GPUs will run efficiently on the compute node 100, but are an inefficient use of the compute node's resources. The compute node 100 may have the capacity to run multiple applications concurrently, which may make more efficient use of the available resources. However, users commonly request applications to be run on dedicated (i.e., not concurrently shared with other users) compute nodes.

A second problem with current data center architecture is the aggregation of the functional elements of compute nodes into physical modules such that the development cycle of individual functional elements is tied together. This aggregation typically precludes upgrading one functional element of a compute node without replacing the entire module. Further, failure of any of the core elements (CPU, GPU, etc.) of an aggregate compute node requires replacement of the entire compute node.

An alternative to typical data center architecture is to have the core components (CPUs, GPUs and other application accelerators, storage, memory, etc.) of compute nodes disaggregated, remotely located, or physically separated, and interconnected by a low latency, reconfigurable fabric. Disaggregation allows compute nodes of any desired configuration to be created by coupling the appropriate resources through the switching fabric. Further, disaggregation allows upgrading or replacing one type of core component without impacting other components. A high throughput, low latency reconfigurable fabric is a critical enabling technology for disaggregated data centers. However, technology to accomplish reconfigurable PCIe data path transport to remote computing assets does not yet exist.

Figure 1:
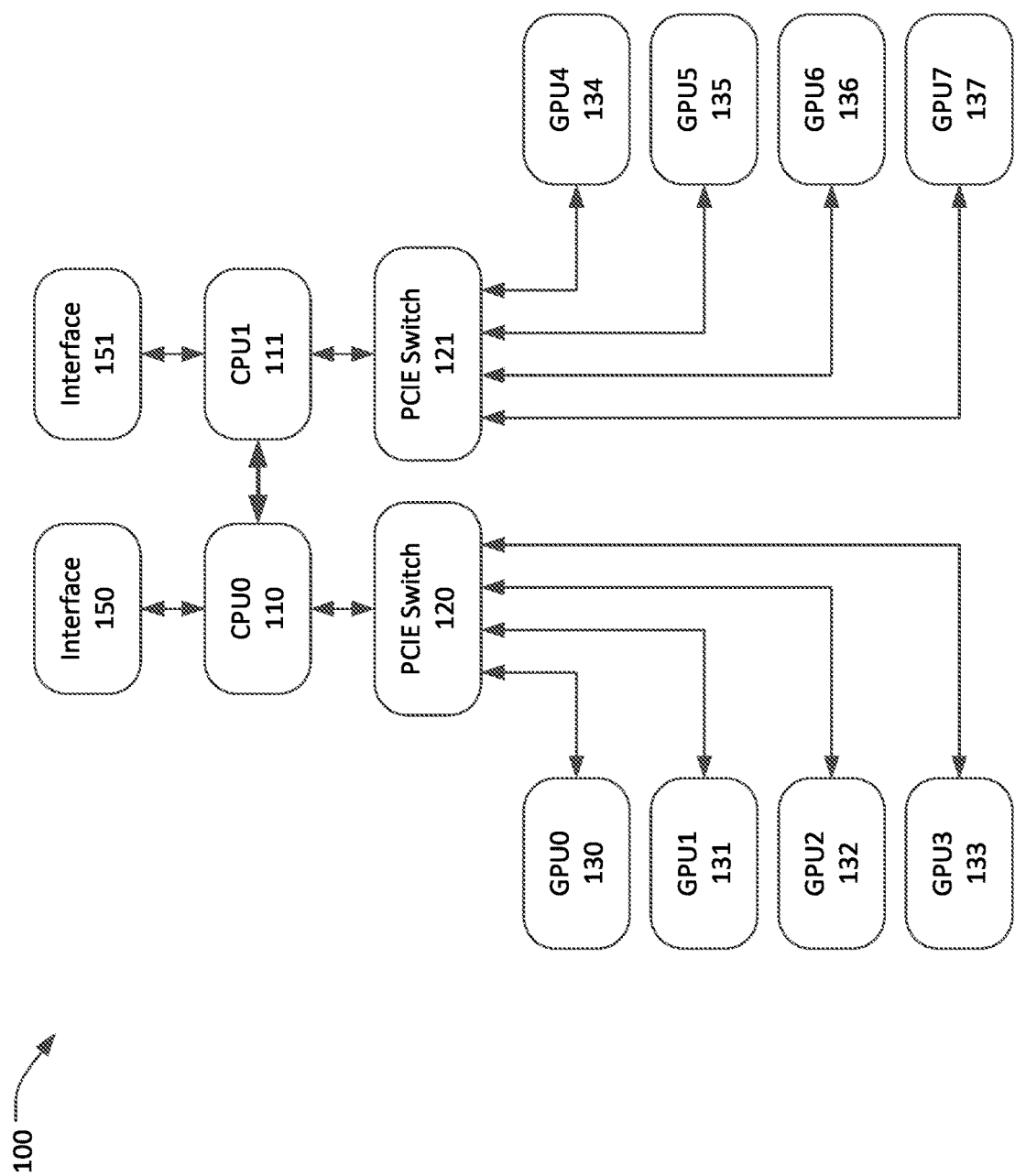
FIG. 1 is block diagram of an exemplary conventional compute node.

Throughout this description, elements appearing in figures are assigned three-digit or four-digit reference designators, where the two least significant digits are specific to the element and the one or two most significant digits is the figure number where the element is first introduced. An element that is not described in conjunction with a figure may be presumed to have the same characteristics and function as a previously-described element having the same reference designator or the same two least significant digits.

DETAILED DESCRIPTION

Description of Apparatus

Reconfigurable clusters or pools of computing resources such as servers allow composability of infrastructure resources into compute nodes as per cloud computing workload requirements. Compute node reconfiguration can be achieved by dynamically attaching and detaching computing resources from the cluster as needed to form differently configured computing (e.g., "compute") nodes from the same cluster. In some cases, software defined networking (SDN) based configuration is used to dynamically build-up a cluster of computing assets into nodes that are cloud-scale workload topologies. Reconfiguring clusters of resources and/or compute nodes may be part of reconfiguring a PCIe data path transport.

The nodes have configured peripheral component interconnect express (PCIe) transports, such as a programmed field programmable gate array (FPGA) of a fabric interface card (FIC) or device that converts serial PCIe electrical data received from one computing asset to parallel data for transmission on a data path transport, such as an optical switch, to a configured FIC of another computing asset. The configured data path transports transparently extend the PCIe buses of these assets to each other through the data path transport. The configurable cluster provides seamless integration with insight into the impact of the changes before and after attaching and detaching computing resources to form nodes. This cluster architecture can also provide flexible scale-out management, such as: per-node (i.e., within a chassis), per-rack (within multiple chassis inside a single rack), per-POD (group of racks), per-zone (group of PODs) or per-DC (group of zones).

In some cases, a computing system for PCIe communication between remote computing assets has a fabric interface device that is configured to receive multi-lane serial PCIe data from functional elements of a computing asset through a multi-lane PCIe bus, and to transparently extend the multi-lane PCIe bus by converting the multi-lane PCIe data into a retimed parallel version of the PCIe multi-lane data to be sent on one or more bidirectional communication paths of a data path transport. The interface device is also configured so that the multi-lane PCIe bus can have a first number of lanes and the bidirectional data communication paths can have a different second number of lanes.

The data path transport can be any one or more types of low latency mediums or data paths, such as an optical and/or electrical data path. For example, an optical data path can have fiber optic connectivity that uses an optical switch, an optical crossbar or any other optical arrangement, in which two endpoints can be optically connected (e.g., point-2-point) for optical data transport. An optical circuit switch is one way to connect two endpoints. The optics can be single mode optics or multi-mode optics. Example electrical data paths can have direct copper cabling, wires and/or traces by which two endpoints are electronically connected for electrical data transport. A combination of optical and electrical data paths can also be used. In this case, the endpoints can be the same type of data path such as where both are electrical or optical. In some cases, the transport can be an OEO (optical-electrical-optical) direct interface or via a switch if the overall switching latency is within the timeframe of the timers that both ends of PCIe fabric require. In some cases, the transport can be a 3D MEMS based PXC (photonic cross-connect) switch. Many of these types of data paths can be wireless. The data path transport is a part of the computing system that forms connections between pairs of data communications paths of multiple ports such as ports of multiple computing assets.

Figure 2:
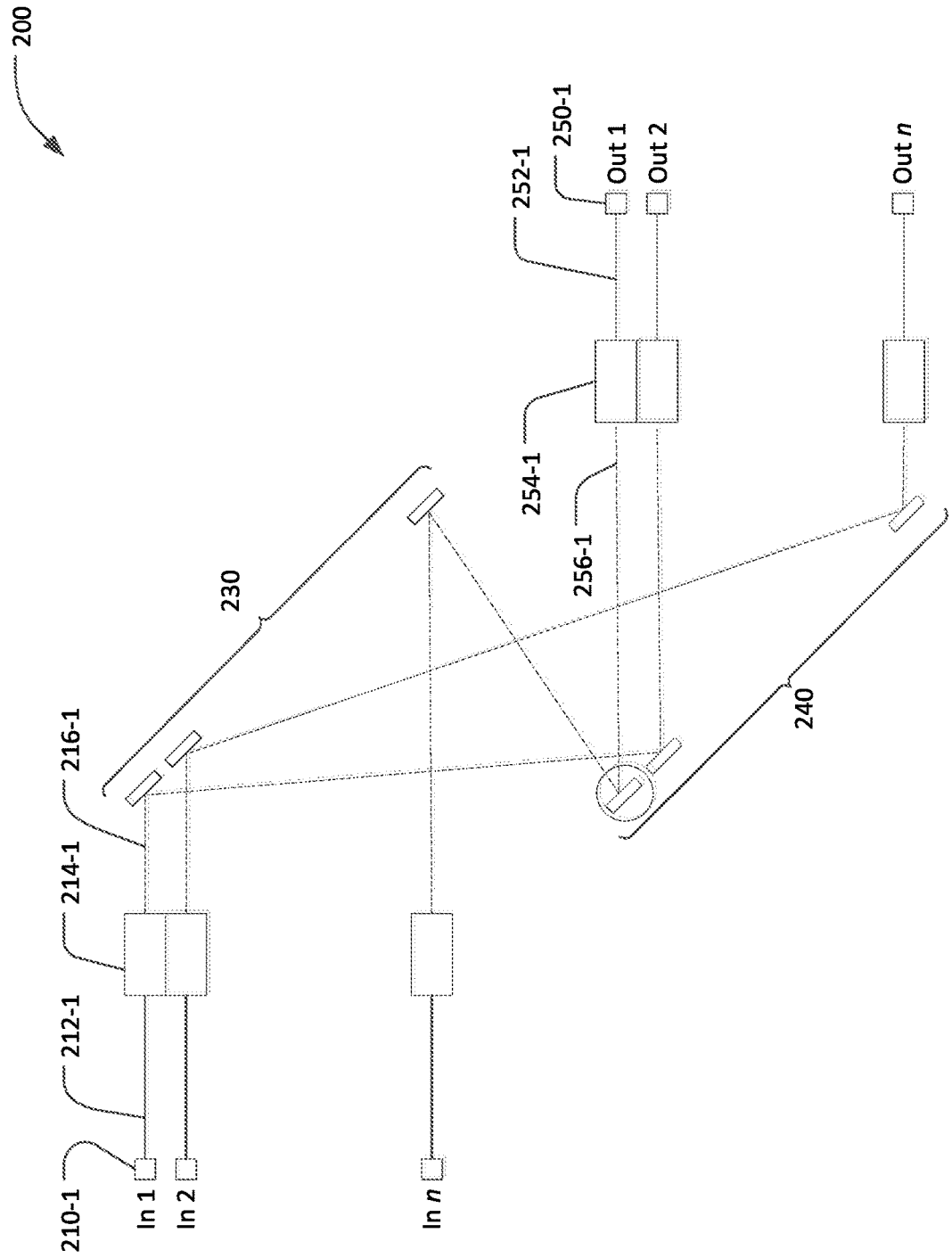
FIG. 2 is an optical schematic diagram of an optical circuit switch.

Referring now to FIG. 2, an exemplary optical circuit switch 200 uses rotatable MEMS (micro electro-mechanical systems) mirrors to connect a group of n input ports (where n is an integer greater than 1), labeled In 1 to In n, to a group of n output ports, labeled Out 1 to Out n. Switch 200 is an example of a data path transport. More specifically, the optical circuit switch 200 may selectively connect up to n pairs of ports, where each pair of ports includes an input port and an output port of two different computing assets. Other types of optical circuit switches may use switching technology other than rotatable mirrors.

In the optical circuit switch 200, each of the input ports In 1 to In n may be a connector (of which only the connector 210-1 is identified) to receive an input optical signal from a fiber optic cable (not shown) external to the optical circuit switch. Each connector may be coupled by a respective optical fiber (of which only optical fiber 212-1 is identified) to a respective collimator lens (of which only collimator lens 214-1 is identified). Each collimator lens may convert the input optical signal from the respective optical fiber into a collimated input optical beam (of which only input optical beam 216-1 is identified) in free space. Free space optical beams are shown in FIG. 2 as dashed lines.

Each input optical beam, such as input optical beam 216-1 may be directed onto a first mirror array 230. The first mirror array 230 may include n MEMS mirrors with a one-to-one correspondence between input optical beams and mirrors, such that each input optical beam is directed onto a respective mirror. Since each of the n input optical beams originates from a specific port and is directed onto a specific mirror, each port may be described as "uniquely associated" with a corresponding mirror. In this patent, "uniquely associated" means a one-to-one correspondence.

Each mirror on the first mirror array 230 may be rotated to reflect the respective input optical beam to a selected mirror of a second mirror array 240. The mirrors of the second mirror array may reflect the incident beam to form a respective output optical beam (of which only output optical beam 256-1 is identified). Each mirror in the second mirror array 240 is uniquely associated with a respective output port. The output optical beam may be directed to a corresponding focusing lens (of which only focusing lens 254-1 is identified). Each focusing lens may focus the respective output optical beam into an output optical signal in a respective optical fiber (of which only output optical fiber 252-1 is identified). The output optical signal may be conveyed to the respective output port connector (of which only connector 250-1 is identified).

The optical circuit switch 200 may create a one-to-one connection between each input port and any one of the output ports. For example, as shown in FIG. 2, Port In 1 is connected to port Out 2, port In 2 is connected to port Out n, and port In n is connected to port Out 1. Each of the optical beams or connection can contain one or more lanes of optical data. In some cases, each contains 2, 4, 8 or 16 lanes of data.

A typical optical circuit switch may have a plurality of ports and be capable of selectively connecting any port to any other port in pairs. Since an optical circuit switch does not convert information flowing over the fiber optic communication paths to electrical signals, the bandwidth of an optical circuit switch is essentially the same as the bandwidth of the optical communications paths. Further, an optical circuit switch is information agnostic, which is to say oblivious to, and not dependent upon, the data rate and protocols of the information flowing over the fiber optic communications paths. Connections through an optical circuit switch may use the same or different protocols and the same or different data rates. After the appropriate MEMS mirrors are rotated to establish a connection through an optical circuit switch, the optical circuit switch does not introduce any additional latency. These descriptions regarding a typical optical circuit switch may also apply to a data path transport as used herein.

Figure 3:
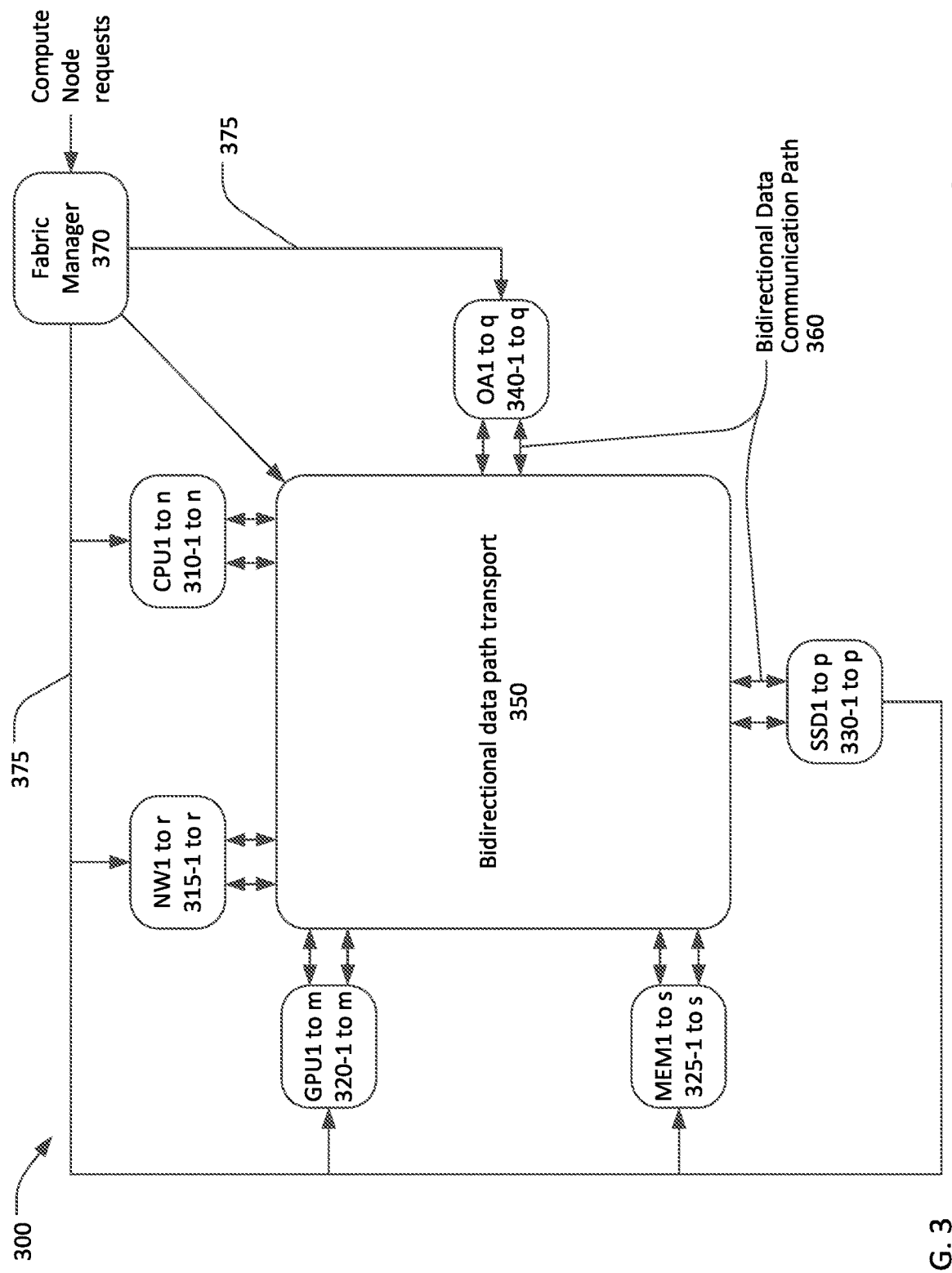
FIG. 3 is a block diagram of a computing cluster incorporating a bidirectional data path transport.

FIG. 3 is a block diagram of the bidirectional physical connectivity of a reconfigurable disaggregated fabric of computing cluster 300, which may be all or a portion of a cloud computing data center. Cluster 300 may be or may be part of reconfiguring a PCIe data path transport to remote computing devices. The computing cluster 300 incorporates a bidirectional data transport path 350 such as an optical circuit switch, which may be an example of switch 200, to provide reconfigurable bidirectional communications paths between a variety of computing assets. In this context, a "computing asset" is any of a variety of functional blocks that may be incorporated into a compute node. Each computing asset includes functional elements such as elements that perform some function within a compute node and/or perform a function of a central processing unit (CPU). Each computing asset also includes interface elements such as a fabric interface device to allow computing assets to communicate with each other via the optical circuit switch 350. A computing asset may be or include at least one of the following: a CPU, a memory, GPU assets, network interface, or solid state drive (SSD). The internal structure of computing assets will be described in more detail subsequently. In some cases, a compute node is a computer network node. A compute node may be or have the functionality of at least one computing asset.

In the example of FIG. 3, the computing assets include n CPU assets (computing assets 310-1 to 310-$n$), r network interface assets (NW asset 315-1 to 315-$r$), m GPU assets (GPU asset 320-1 to 320-$m$), s memory assets (MEM asset 325-1 to 325-$s$), p solid state drive (SSD) assets (SSD asset 330-1 to 330-$p$) and q other assets (OA asset 340-1 to 340-$q$) where n, r, m, s, p, and q are positive integers. The other assets may be, for example, other types of application accelerator processors, other types of memory or storage, network interfaces, or other functional elements. FIG. 3 is exemplary, and the type and quantity of computing assets connected to a data transport path may be determined by the needs of each data center. A computing cluster will typically include multiple CPU assets, but may not necessarily include all of GPU assets, SSD assets, or other assets noted in FIG. 3.

There are at least two bidirectional data communications paths 360 between each of the computing assets 310-1 to 340-$q$ and the data transport path 350. Each bidirectional data communications path may define a lane for transmitting data to and a lane for receiving data from the transport. Thus, this path is a multi-lane bidirectional data communications path. Each multi-lane bidirectional data communications path consists of at least two data paths, such as optical fibers, one of which is connected to an output port and the other of which is connected to an input port of the transport 350, such as of an optical circuit switch. In some cases, each bidirectional data communications path is a lane for both transmitting and receiving data. In this case, the path is a single lane bidirectional data communications path between a computing asset and the transport. Here, each bidirectional data communications path consists of one data path, such as one optical fiber, which is connected to an input and to an output port of the transport 350, such as of an optical circuit switch. For example, with the help of some passive optical technologies (like circulator), both input and output of the single lane could be carried on the same port of the transport. An additional advantage of the single lane path is that in that case, the transport or optical switch capacity is doubled. As will be discussed in subsequent examples, some or all of the computing assets may be connected to the transport 350 by more than two bidirectional data communications paths to communicate with multiple computing assets. In some cases, some or all of computing assets are connected to the transport 350 by 2, 4, 8 or 16 bidirectional data communications paths 360 for each other computing asset they are communicating with. Each of these paths may be a multi-lane or a single lane path.

There is at least one fabric interface device such as a fabric interface card (FIC) between each bidirectional data communications path and each computing asset and/or the functional elements of each asset. The fabric interface device converts serial PCIe data received from the functional elements to parallel optical data to be transmitted on the bidirectional data communications path(s) to the transport 350. It also converts parallel data received from the paths back to serial PCIe data to be sent to the functional elements.

The number of computing assets in a computing cluster are limited by the number of ports on the transport 350 and the number of data communications paths between the transport 350 and the computing assets. For example, a transport 350 may be capable of making connections between 320 input ports and 320 output ports. This optical circuit switch can interconnect 160 computing assets with two bidirectional data communications paths 360 between each of the computing assets and the transport 350. Multiple transports 350 may be cascaded to provide a transport or switching fabric with a nearly unlimited number of ports.

The computing cluster 300 includes an orchestrator or fabric manager computing device 370 that exists out-of-band from the optical switch data signals and sideband channel signals. Here, "out-of-band" (OOB) means that there exists a management path to each functional element or computing asset that the device 370 individually controls when these elements are connected together (i.e., CPU to GPU; or CPU to Network or to SSD). There exists a data-path 360 between the functional elements or computing assets which is called "in-band". However, since each of these elements or assets are disaggregated now, an out-of-band management path can be used to control them. Typical this OOB path is used for management or control only, it does not generally carry any in-band data (e.g., any user-data). A "computing device" is a device having a processor and memory capable of executing stored instructions to perform some function. The fabric manager computing device 370 executes a configuration management program to manage the configuration and/or operation of the computing cluster 300. The fabric manager computing device 370 is coupled to the computing assets (CPU Asset 310-1 to 310-$n$, NW Asset 315-1 to 315-$r$, GPU Asset 320-1 to 320-$n$, MEM Asset 325-1 to 325-$s$, SSD Asset 330-1 to 330-$n$, and Other Asset 340-1 to 340-$q$) via a configuration path 375. The configuration path 375 may be a serial or parallel bus, a local area network, or some other communications path that allows the fabric manager to provide configuration information and/or software to computing assets as those assets are assigned to particular compute nodes. The fabric manager computing device 370 is also coupled to the transport 350. The fabric manager computing device 370 receives user requests for compute nodes, such as from a fabric agent. It then selects available computing assets of the cluster, instructs the transport 350 to establish the appropriate connections between the selected computing assets, and provides configuration information to configure the selected computing assets. Computing device 370 may exist within any of the computing assets, functional elements, FICs or within a separate computing device. Fabric manager device 370 can be a computing device having program instructions or a software entity executed by a processor. The instructions or software can run on any machine (desktop, severe or Virtual machine computer). Device 370 connects or manages different elements or resources by an OOB network (i.e., ethernet switch), such as where the elements or assets are all connected on a separate management network. Each of the FICs and/or assets have a management port on them (typically 10/100/1000 mega-bits per second) that is connected with an ethernet switch that has a connectivity to the device 370, such as to a server where device 370 software is running. User data traffic on data-paths 360 does not carry on this network, instead only control and management traffic goes over this network.

The fabric manager computing device 370 may repeatedly update the configuration and/or operation of the computing cluster 300. Thus, cluster 300 and/or computing assets (CPU Asset 310-1 to 310-n, NW Asset 315-1 to 315-r, GPU Asset 320-1 to 320-n, MEM Asset 325-1 to 325-s, SSD Asset 330-1 to 330-n, and Other Asset 340-1 to 340-q) are disaggregated and/or reconfigurable. Disaggregation allows computing assets of cluster 300 to be created in any configuration by coupling the appropriate resources through the fabric manager computing device 370. Further, disaggregation allows upgrading or replacing one type of computing asset without impacting other computing assets. Thus, cluster 300 may be a high throughput, low latency reconfigurable switching fabric.

Any or all of the computing assets (CPU Asset 310-1 to 310-n, NW Asset 315-1 to 315-r, GPU Asset 320-1 to 320-n, MEM Asset 325-1 to 325-s, SSD Asset 330-1 to 330-n, and Other Asset 340-1 to 340-q) in the computing cluster 300 may have additional interfaces to other elements not shown in FIG. 3. For example, some or all of the computing assets (CPU Asset 310-1 to 310-n, NW Asset 315-1 to 315-r, GPU Asset 320-1 to 320-n, MEM Asset 325-1 to 325-s, SSD Asset 330-1 to 330-n, and Other Asset 340-1 to 340-q) may have Ethernet or other network interfaces to connect to a top-of-rack (TOR) switch. Additionally, one or more of the Other Assets 340-1 to 340-q may also be network interfaces.

Figure 4:
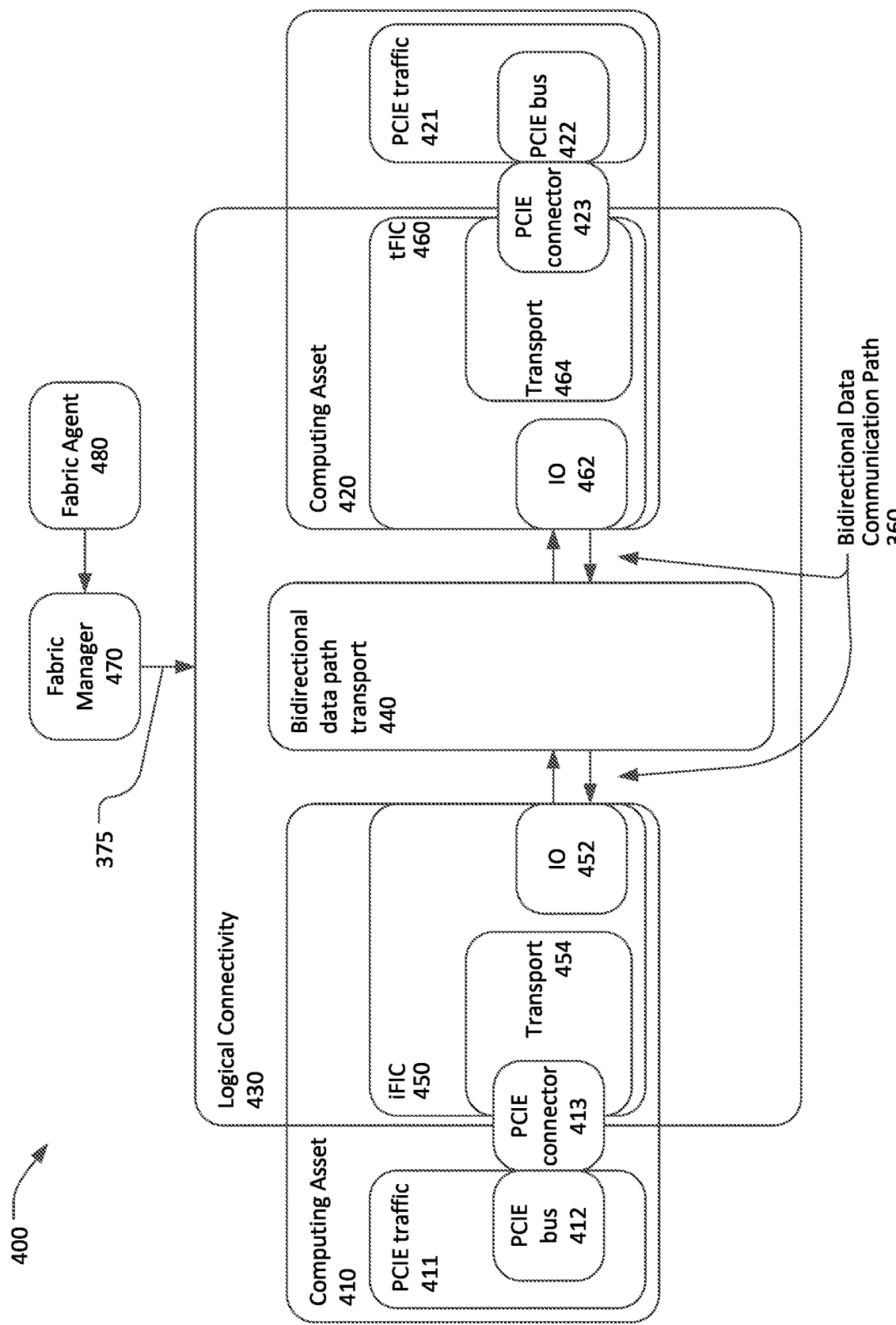
FIG. 4 is a block diagram of the logical connectivity between two computing assets of a computing cluster.

FIG. 4 is a block diagram of the logical connectivity 430 between two computing assets 410 and 420 of a computing cluster 400. Cluster 400 and/or connectivity 430 may be part of a reconfigurable PCIe data path transport to remote computing devices. The logical connectivity 430 may be a reconfigurable disaggregated fabric of the computing cluster 400 that is all or a portion of a cloud computing data center. Cluster 400 may represent the logical bidirectional connectivity between any two computing assets of cluster 300. Cluster 400 shows compute side (initiator) computing asset 410 logically bidirectionally connected to resource side (target) computing asset 420 using bidirectional logic connectivity 430. Logic connectivity 430 may be a software-defined distributed fabric backplane that creates logical connectivity 430 between initiator FIC (iFIC) 450 and target FIC (tFIC) 460 through a data bidirectional data path transport 440 such as an optical or photonic circuit switch, switch 200 or switch 350. Connectivity 430 has transport 440 connecting lanes of bidirectional data communication path input/output (IO) 452 of iFIC 450 to lanes of bidirectional data communication path IO 462 of fFIC 460. Each of FICs 410 and 460 are bidirectional connected to PCIe traffic 411 and 421 of compute assets 410 and 420 thorough PCIe buses 412 and 422, respectively. PCTe traffic 411 and 421 may be data from or may represent a PCTe switch, PCTe controller, PCIe endpoint, PCIe entity or other PCIe data domain. For example, traffic 411 may be PCIe data from a "root port", and traffic 421 may be PCIe data from a "device or peripheral." Also, although the bidirectional data path transport 440 and data communication paths 360 are used in cluster 400, the transport can be a bidirectional optical transport that optically connects the optical lanes of optics IOs 452 and 462 of the FICs. For example, the bidirectional data communication paths 360 may be one or more optical fibers.

Each of FICs 450 and 460 have a multi-lane serial PCIe electrical data to multi-lane retimed parallel PHY Interface for the PCI Express (PIPE) data transport 454 and 464 configured to convert electrical data received from the PCIe buses 412 and 422 to a retimed parallel version of the PCIe multi-lane data to be transmitted on IOs 452 and 462, respectively. The transport 454 and 464 are also configured to convert retimed parallel versions of the PCIe multi-lane data received from IOs 452 and 462 to multi-lane serial PCIe electrical data transmitted to the PCIe buses 412 and 422, respectively. The FICs are configured to transparently extend the multi-lane PCIe buses through the bidirectional transport 440 without the computing assets or functional elements being aware of the FICs, the data communication paths 360 or the transport 440 because the assets and element are not exposed to any changes to the PCIe data or PCIe control signals at the PCIe buses 412 and 422.

Any or all of the computing assets in the computing cluster 400 may have additional bidirectional interfaces to other elements not shown in FIG. 4, such as Ethernet or other network interfaces to connect to a top-of-rack (TOR) switch such as described for FIG. 3.

Each of the FICs 450 and 460 may be connected to the PCIe buses 412 and 422 by a removable bidirectional PCIe bus connector 413 and 423. Each of the bidirectional IOss 452 and 462 may be connected to the transport 440 by one or more bidirectional data communication paths 360. Each of multi-lane PCIe buses 412 and 422 has a first number of bidirectional PCIe electrical data lanes and each of the one or more bidirectional data communication path 360 has a second number of retimed bidirectional parallel versions of the PCIe multi-lane data lanes. In some cases, the first number does not equal the second number. That is, the transports 454 and 464 may be configured to change the number of lanes of PCIe electrical data to a different number of lanes of retimed parallel versions of the PCIe multi-lane data used on the transport 440. The transports 454 and 464 are also be configured to change the different number of lanes of retimed parallel version of the PCIe multi-lane data to a number of lanes of PCIe electrical data; such as by performing the reverse of the above change from PCIe to retimed parallel data.

The software-defined distributed fabric backplane that creates logical connectivity 430 may be created by fabric manager 470 which may be similar to fabric manager 370 and may use configuration path 375. Manager 470 may be controlled by a disaggregated fabric agent 480 connected to manager 470 that is user or a computer controlled. The manager 470 can be used to configure and reconfigure transports 454 and 464 to convert various numbers of lanes of data of the PCIe buses 412 and 422 to various numbers of lanes of retimed parallel versions of the PCIe multi-lane data for IOs 452 and 462. The manager 470 can also be used to configure transport 440 for communicating any of the various number of lanes of retimed parallel versions of the PCIe multi-lane data between the FICs 450 and 460.

In addition, the FICs 450 and 460, and transport 440 are configurable by the fabric manager 470, such as using OOB signals on paths 375, so that iFIC 450 can communicate with multiple tFICs such as tFIC 460 using a different number of retimed parallel versions of the PCIe multi-lane data lanes for each such tFIC. In addition, the FICs and transport 440 are configurable by the fabric manager 470 so that tFIC 460 can communicate with multiple iFICs such as iFIC 450 using a different number of retimed parallel versions of the PCIe multi-lane data lanes for each such iFIC. Since connectivity 430 is configurable, it is also capable of communicating or incorporating the compute express link (CXL) standard, the cache coherent interconnect for accelerators (CCIX) standard, the open coherent accelerator processor interface (OpenCAPI) standard or the GenZ standard as they become available.

The FICs may be hardware boards or circuit cards containing at least one integrated chip. In some cases, the FICs have a field programmable gate array (FPGA) and/or application-specific integrated circuit (ASIC) that is programmed to retime PCIe data received from the PCIe bus into the retimed parallel version of the PCIe data using an electronic first in first out (FIFO) circuit that stores the PCIe data so that it can be retimed into a different clock frequency and sent as the retimed parallel data. The retiming may use a hardware or programmed FPGA circuit multiplexer/demultiplexer to convert between the electrical PCIe data and the electrical parallel data. In cases where the retimed parallel versions of the PCIe multi-lane data is to be carried as optical data, the FPGA may also be programmed with an electrical to optical serializer/de-serializer (SERDES) circuit that converts the retimed FIFO electrical data into optical or photonic signals. The SERDES is an optional module or transceiver that performs electrical to optical conversion of the FIFO data into retimed parallel optical data. In this case, the FPGA may only convert the parallel retimed FIFO data to serial data with some encoding, and this serial data is provided to the SERDES optical transceiver that converts the serial electrical data into optical signals to be sent to transport 440. In some cases, the FPGA has resistor transistor logic (RTL) or firmware that times the PCIe data for clocking into the FIFO. As the system is bidirectional, the circuitry above also converts or retimes the parallel version of the PCIe data received from the data communication paths 360 into PCIe data sent to the PCIe bus.

In some cases, the bidirectional data path transport herein is a low latency PXC (photonic cross-connect) switch that uses hardware and software to perform the functions and configurations of the optical switch 200, switch 350, transport 440 and/or transport 440. In some cases, the fabric manager 370 or 470 is implemented by software, such as computer instructions being executed by a processor.

In some cases, the fabric manager includes an element manager for configuring and managing individual FICs 450 and 460, and the data path transport 440, such as the PXCs Interface to the FICs. In some cases, the fabric manager includes data paths 375 to the FICs and to the data path transport; and a host operating system and end-device chassis interfaces to the fabric agent 480. In some cases, the fabric agent is implemented by software, such as computer instructions being executed by a processor. In some cases, the fabric agent includes an interface to an orchestration layer (e.g., OpenStack, VMware's vCenter, etc.) of the fabric manager.

The IOs 452 and 462 may each include a high-speed SERDES to interface with an external (optical) pluggable module such as small form-factor pluggable (SFP) module, a quad small form-factor pluggable plus (QSFP+) module, etc. The FICs can be mated with various PCIe bus front end configurations. In order to accommodate the varying datum speed and width requirements of various PCIe buses, the FIC interface logic can implement dynamic gearboxes at the PCIe interface boundary towards the PCIe front end to absorb (on the receive side) and to faithfully reproduce (on the retimed parallel versions of the PCIe multi-lane data transmit side) varying sized front end datums as the retimed parallel data.

During configuration, the FICs 450 and 460, and data path transport 440 (e.g., an optical switch) can be customized to a maximal supported data transport configuration. The configuration specifies the maximum number of SERDES (i.e., data path transport lanes or channels) that are allocated to the interface, and consequently the maximum bandwidth of the transport. The configuration also specifies the maximum number of grouping (i.e., bundles) that the interface must support. Each bundle may be a group of channels that implement a singleton independent interface towards exactly one other FIC.

Figure 5:
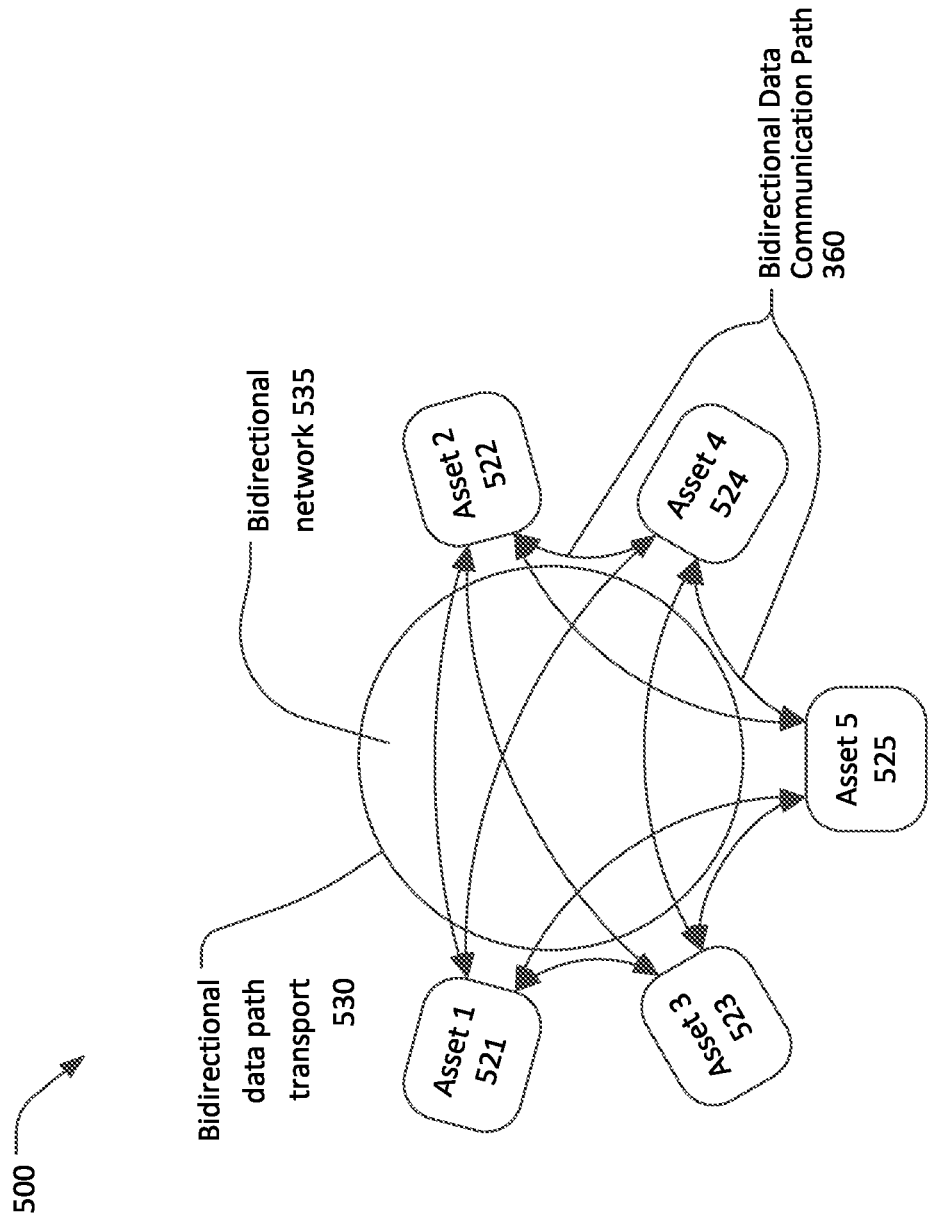
FIG. 5 is a block diagram of a compute node.

Configuring or reconfiguring any number or all of connectivity 430; transports 440, 454 and 464; SERDES; and FICs 450 and 460 may be part of reconfiguring a PCIe data path transport. FIG. 5 is a block diagram of an exemplary compute node 500, which may be a portion of the computing cluster 300 or 400. Node 500 may be a node configured using cluster 300 and/or 400. In the compute node 500 five computing assets 521-425 (Asset 1 to Asset 5) are each connected to each other in pairs via a bidirectional data path transport 530 and bidirectional data paths 360 to form a bidirectional network 535. Any pair of connected assets 521-425 may be assets 410 and 420 and data path transport 530 may be switch 200, switch 350, or transport 440.

The inclusion of five assets in the compute node 410 is exemplary, and a compute node may include fewer or more than five assets. The type of computing assets and the order of the computing assets around the bidirectional network 535 is completely flexible.

Network 535 could be ring network or another network topology such as where the assets are connected in any topology arrangement. As a ring network, assets only directly exchange data with adjacent assets and must push data through an adjacent asset to exchange data with a non-adjacent asset. In another topology of network 535, computing assets can exchange a high volume of data with assets that are not located in adjacent positions on the network 535. Thus, a ring network requires each intervening asset to convert the received retimed parallel signal to electrical data, decide whether to forward the electrical data to functional elements within the asset or to convert the electrical data back to a retimed parallel signal to forward along the ring network. Each intervening asset will introduce some latency when communicating with a non-adjacent asset in a ring network. Also, the number of computing assets included in a ring network may be limited by the maximum allowable latency for communications between computing assets. On the other hand, other topologies of the bidirectional network 535 provide two direct communications paths between any pair of computing assets which avoids the shortcomings of a ring network. Having two data communications paths between some or all pairs of the computing assets and the transport 350 allows greater flexibility in compute node architecture and greater high volume data communication speed between all of the assets since each asset is paired with each of the other assets.

Figure 6:
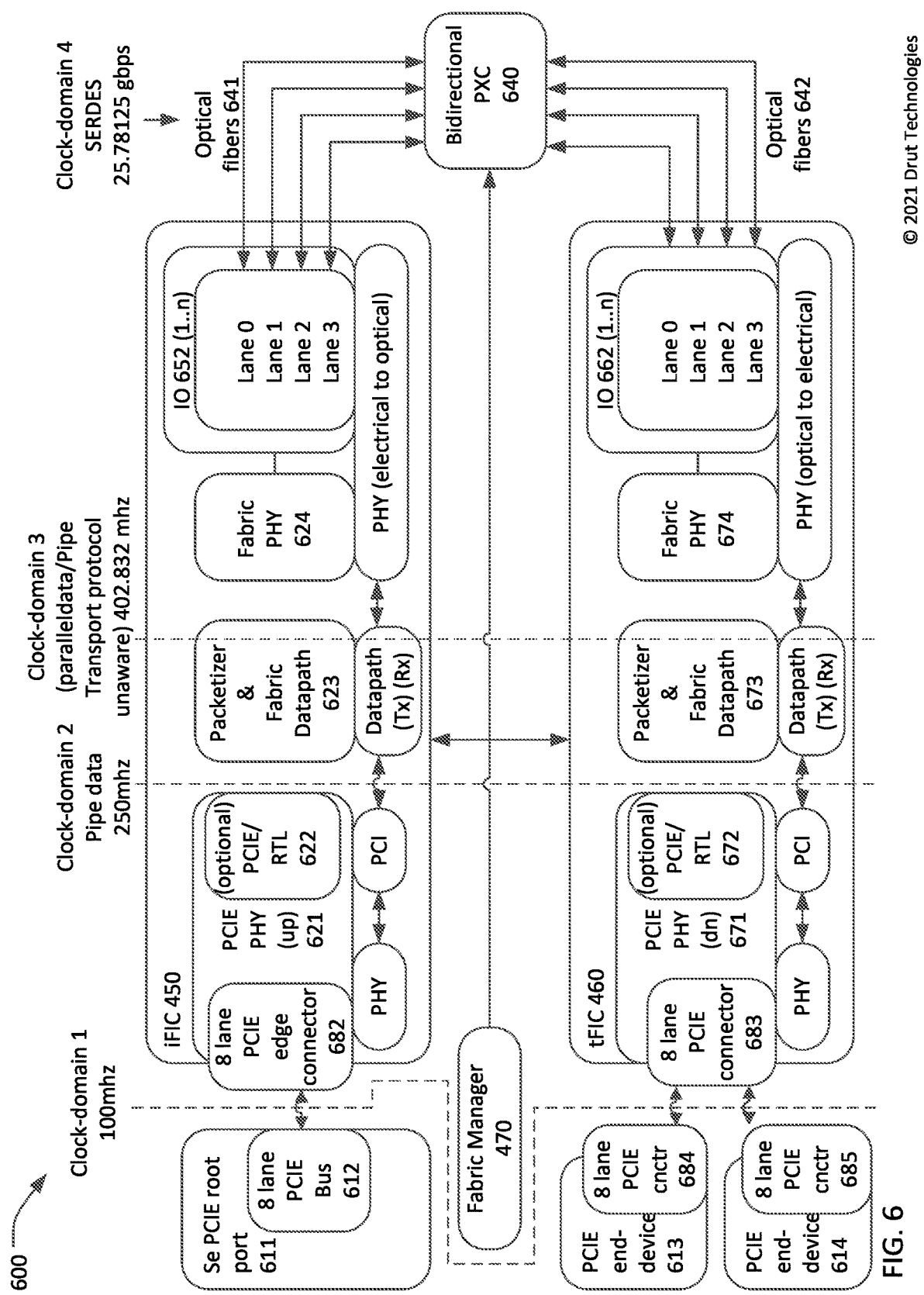
FIG. 6 is a block diagram of a portion of a compute node having a server connected to two end-devices.

FIG. 6 is a block diagram of a portion of an exemplary compute node 600 having a server computing asset connected to two end-device computing assets by a reconfigurable disaggregated fabric of a computing cluster. Node 600 may be a node configured using cluster 300 and/or 400. Node may be a more detailed example of cluster 400 or of a portion of node 500. Node 600 may be or may be part of a reconfigurable PCIe data path transport to remote computing devices.

Node 600 has computing asset 611 with 8 lane PCIe serial data connected through FIC 450 and optical fibers 641 to 4 lane bidirectional PXC (photonic cross-connect) switch 640 which is also connected by optical fibers 642 through FIC 460 to both of 8 lane PCIe serial data computing assets 613 and 614. Thus, node 600 forms a bidirectional network between pair of assets 611 and 613, and between pair of assets 611 and 614 using only two FICs instead of three FICs. Using only two FICs saves hardware costs, electrical power and computing resources. Asset 611 is located remotely from assets 613 and 614 which are not located remotely from each other. Being located remotely may be located on another device chassis, equipment rack, or room. In some cases, one asset being remote from another includes the assets being connected to each other using a computer network interface card such as a fiber interface card used to network different computing devices. In another embodiment, assets 613 and 614 may be located remotely from each other, such as where 8 lane connector 683 connects to either or both of assets 613 and 614 using cluster 400 or as noted for two assets of node 500.

In the compute node 600 computing asset 611 is a server PCIe root port 611 having 8 lane PCIe bus 612 coupled by 8 PCIe lanes to 8 lane bidirectional PCIe edge connector 682 of PCIe PHY (upstream) asset 621 of iFIC 450. Also, computing assets 613 and 614 are PCIe end-devices or resources each having an 8 lane PCIe bus connected by 8 PCIe lanes to 8 lane PCIe edge connectors 684 and 685 to 8 lane bidirectional PCIe straddle connector 683 of PCIe PHY (downstream) 671 of tFIC 460. However, it is appreciated that assets 611, 613 and 614 may be any other assets noted herein; and may send and receive any number of lanes of PCIe traffic such as traffic 411 on PCIe bus 612, connector 684 and connector 685, respectively. There may be more than one of compute side assets 611 similarly linked by a FIC 450 to the 4 lane bidirectional PXC 640 to communicate data through FIC 460 with assets 613 and 614 on the device side. There may be more than two of device side assets 613 and 614 similarly linked by a FIC 460 to the PXC 640 to communicate data FIC 450 with asset 611 on the compute side. Each of the computing assets also has functional elements such as other components, firmware, and software required to perform the functions of the computing asset. PXC 640 may be data path transport 530, switch 200, switch 350, or transport 440. Optical fibers 641 and 642 may be 4 lanes, 4 paths and/or 4 bidirectional data communication paths.

Although the PXC switch 640 and optical fibers 641 and 642 are used in node 600, the switch 640 can be a bidirectional optical transport and the optical fibers can be the bidirectional data communication paths of any of FIGS. 3-5. For example, switch 640 can be (e.g., replaced) any of switch 200, switch 350, transport 440 and/or transport 530 with corresponding bidirectional data communication paths 360.

One objective of the FICs 450 and 460 is to transfer data in PCIe format between the functional elements in the computing assets in a way that is "transparent" to the functional elements. Transparent may be when from the PCIe bus perspective it is as if the PCIe buses were directly coupled at the physical layer (i.e., as if multi-lane PCIe buses extended between each pair of the three PCIe buses of assets 611, 613 and 614).

PCIe PHY 621 may be a physical layer of computer hardware, such as computer circuitry and/or part of an integrated circuit (IC), that receives the serial 8 lane multi-lane PCIe data from the bus via the connector 682. PCIe PHY 621 receives the serial multi-lane PCIe electrical data from clock-domain 1 of 100 MHz and converts that data to 8 lane parallel PCIe data or pipe data of clock-domain 2 at 250 MHz (e.g., 32 bits of 8 lane parallel pipe data at 250 MHz). PCIe PHY 621 may (optionally) include PCIe/RTL 622 (e.g., a PCIe switch) which can re-align data from different PCIe lanes onto a downstream pipe of varying lanes and vice-versa with PCIe/RTL block 672. PCIe/RTL 622 may be computer hardware that is or has resistor transistor logic (RTL) and/or peripheral component interconnect (PCI) logic that performs the conversion.

PCIe PHY 621 is coupled to packetizer and fabric data path 623 which receives the 8 lane parallel PCIe PHY 621 electrical data from clock-domain 2 and performs part of the conversion of that data to retimed parallel data/pipe transport protocol unaware data of clock-domain 3 at 402.832 MHz. Packetizer and data path 623 may be computer hardware that is or has resistor transistor logic (RTL) with transmit and/or receive logic that performs the conversion.

Packetizer 623 takes the parallel PCIe data and all the PCIe control signals for all the lanes from PHY 621 and makes it into one chunk of data (datum) that can be sent out through fabric datapath of PHY 624. Since it is bidirectional, in the other direction, packetizer 623 also takes the packetized data received from fabric datapath of PHY 624 and dis-assembles it into PCIe control signals and PCIe user data sent to PHY 621. The functions of packetizer 623 and 673 will be discussed in the figures below.

Packetizer and data path 623 is coupled to fabric PHY 624 which receives the data from packetizer and fabric data path 623 and performs part of the conversion of that data to parallel data/pipe transport protocol unaware data of clock-domain 3 at 402.832 MHz. Fabric PHY 624 may be computer hardware that is included in a PHY physical layer that converts electrical data signals to optical data signals.

Fabric PHY 624 is coupled to optical input/output (IO) 652 which is capable of forming 1 . . . n optical connections with other similarly equipped FICs. In node 600 the FICs and PXC 640 are configured to use 4 lanes of optical fibers 641 and 642 to communicate the optical parallel data between IO 652 and IO 662. IO 652 receives the data from fabric PHY 624 and converts the parallel data/pipe transport protocol unaware data of clock-domain 3 at 402.832 MHz to clock-domain 4 serialize/deserialize (SERDES) data at 25.78125 Gbps. Node 600 may use 4 lanes of optical data such as by nxQSFP28+ for bundles across QSFPs if bandwidth requirements to any specific asset pool is more than the bandwidth of the optical switch. Node 600 could instead use up to 16 bundles with each at 25.78125 Gbps, or any combinations of 25.78125 Gbps. For instance, with bigger or multiple FPGAs more bundles could be built. The architecture of the node can adapt to change in PHY speeds to 56 Gbps or 112 Gbps, etc. IO 652 may be computer hardware that is included in a PHY physical layer that converts electrical data signals to optical data signals. It is appreciated that although 4 lanes are shown for node 600 another number of lanes can be used such as 2, 6, 8, or 16 lanes. Also, PXC 640 can have a configuration that handles more lanes that are provided by fibers 641 and 642.

Figure 7:
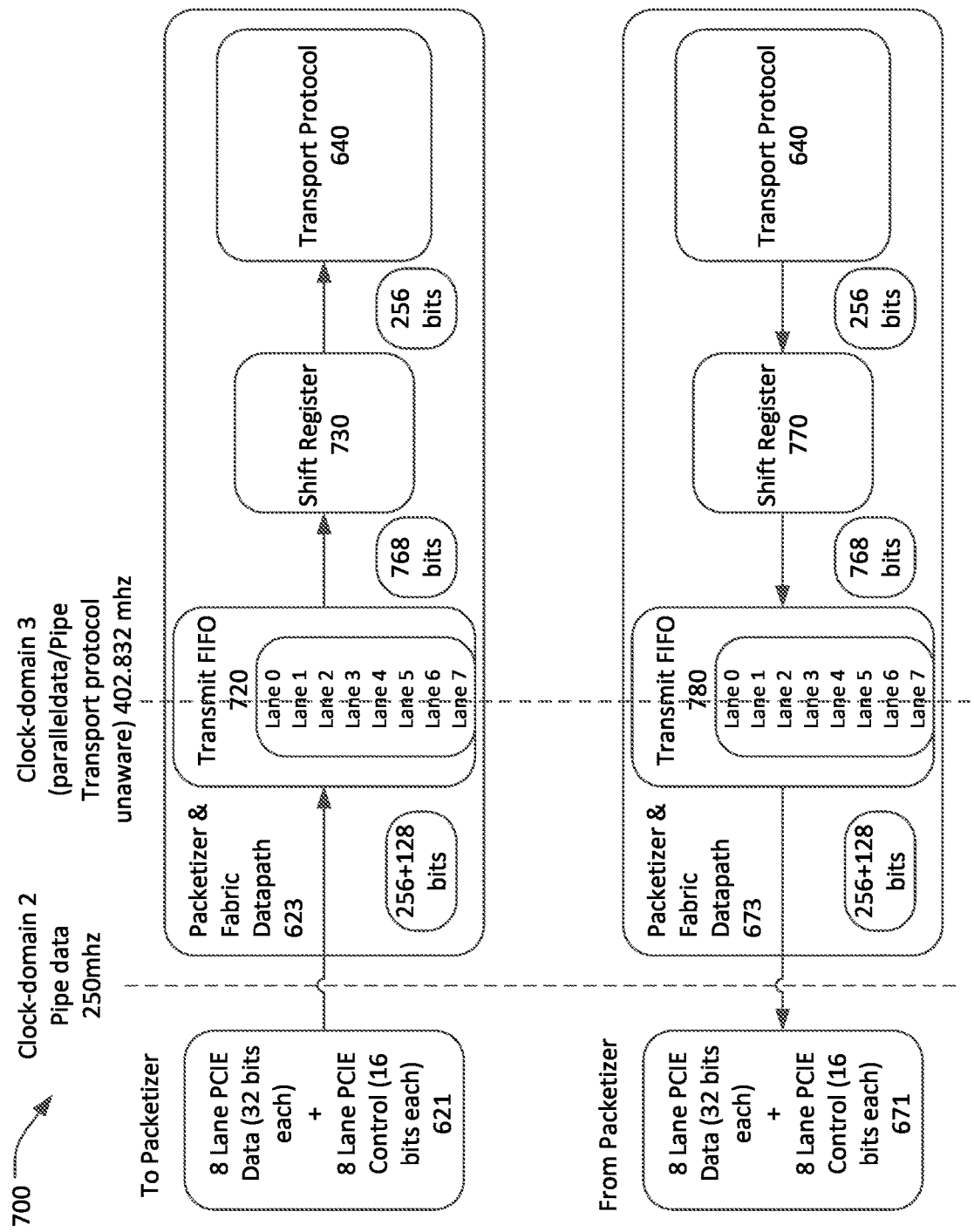
FIG. 7 is a block diagram of an 8 lane PCIe implementation of a fabric datapath.
Figure 8:
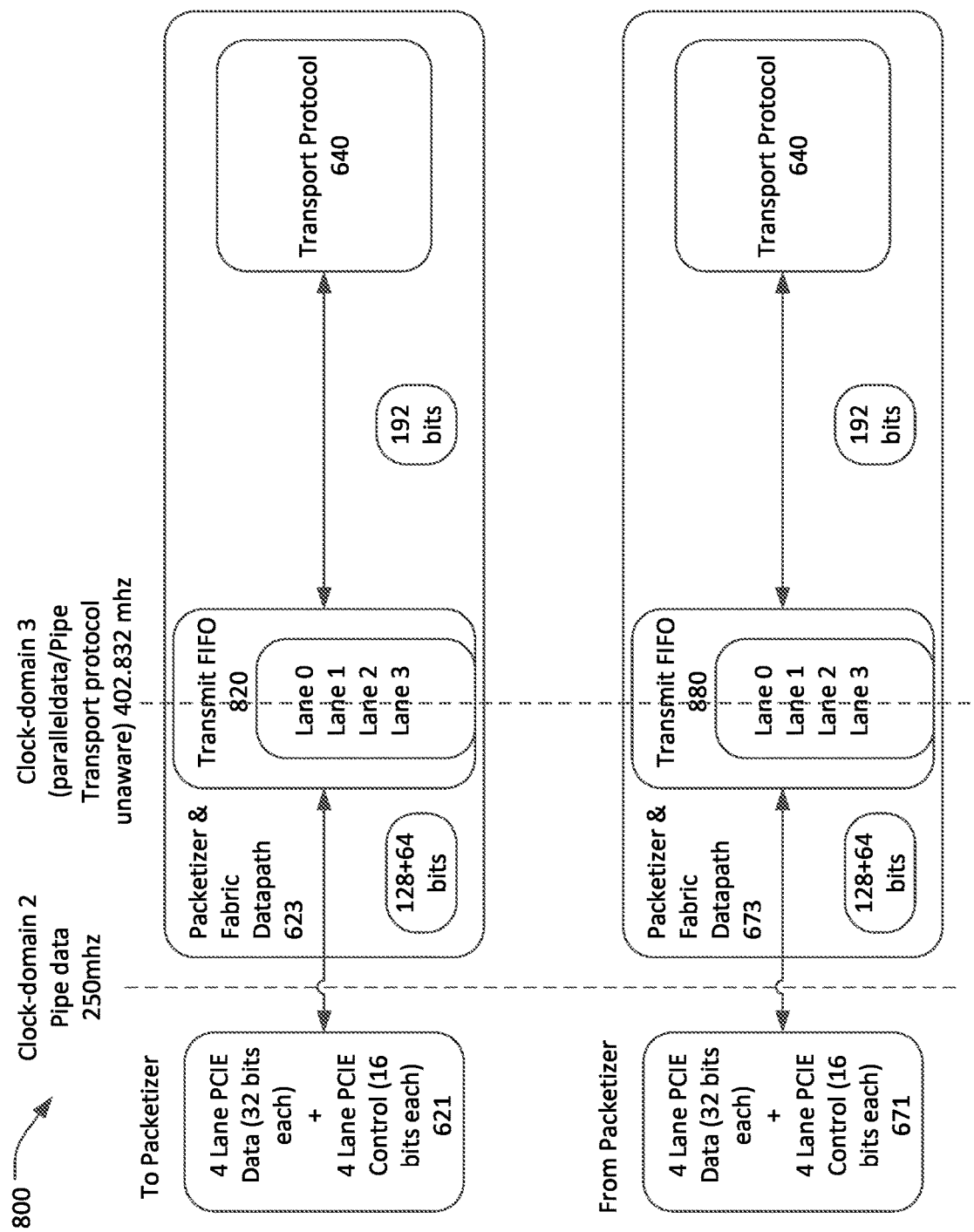
FIG. 8 is a block diagram of a 4 lane PCIe implementation of a fabric datapath.

FIGS. 7 and 8 are two embodiments 700 and 800 of how it is possible to reconfigure a PCIe data path transport to remote computing assets. That is, they are converting 8 lanes and 4 lanes of PCIe data using the same node, for example node 600 or any node of cluster 300-600. The concepts described for FIGS. 6-8 apply to a different number of lanes of PCIe data, other than 4 or 8 lanes, such as 2, 16, 32 or 64, etc. lanes of PCIe data at 621 and 671.

For example, embodiment 700 is configured to configure and retime 8 lanes of PCIe data or traffic to the retimed parallel data sent on data paths 360 to a bidirectional data transport protocol over, such as that of PXC 640. Also, embodiment 800 is configured to configure and retime for 4 lanes of PCIe data or traffic to the retimed parallel data sent on data paths 360 to a bidirectional data transport protocol over, such as that of PXC 640. In fact, FICs 450 and 460; and/or datapaths 623 and 673 are programmable to retime and convert different numbers of lanes of the PCIe data to and from different numbers of retimed parallel data lanes for different types of data transport (e.g., transport types as noted for transport 350, 440, 530 and or 640).

In the 8 lane PCIe data implementation, fabric data path 623 takes samples of the packetized data from PHY 621 in one clock domain and samples it again in another clock domain before sending it to IO transport protocol IO 652. For example, FIG. 7 is an embodiment 700 of datapath 633 and datapath 683 for an 8 lane PCIe data bus or traffic implementation, such as where bus 612, connector 684 and connector 685 are each 8 lanes of PCIe data. FIG. 7 shows data path 633 from packetizer 621 having 8 lanes of PCIe data with 32 bits of data per lane and 8 lanes of PCIe control data with 16 bits per lane. Thus, upon entry, data path 632 is 256 bits of PCIe data and 128 bits of control data, all as clock-domain 2 pipe data at 250 Mhz. Upon the entry of data from PHY 621, datapath 623 takes samples of the packetized data at packetizer 623 and sends it as is to transport protocol to PHY 624. To do this, datapath 623 sends the data from packetizer 623 to transmit first in first out (FIFO) 720 which further samples the data into 512 bits of data and 256 bits of control that are output as 768 bits of data to shift register 730 which sends the bits of data to the data transport 640. The shift register 730 cuts the incoming data into 256 bit packets for the data transport 640.

For a 4 lane PCIe data implementation, fabric data path 623 takes the packetized data from PHY 621, samples it, and sends as is to IO transport protocol IO 652. For example, FIG. 8 is an embodiment 700 of datapath 633 and datapath 683 for a 4 lane PCIe data bus or traffic implementation, such as where bus 612, connector 684 and connector 685 are each 4 lanes of PCIe data. FIG. 8 shows data path 633 from packetizer 621 having 4 lanes of PCIe data with 32 bits of data per lane and 4 lanes of PCIe control data with 16 bits per lane. Thus, upon entry, data path 632 is 128 bits of PCIe data and 64 bits of control data, all as clock-domain 2 pipe data at 250 Mhz. Upon the entry of data from PHY 621, datapath 623 takes 1 sample of the packetized data at packetizer 623 and sends it as is to transport protocol to PHY 624 or data transport 640. To do this, datapath 623 sends the data from packetizer 623 to transmit first in first out (FIFO) 820 which single samples the data into 128 bits of data and 64 bits of control that are output as 192 bit packets of serial data sent to the data transport 640.

Between datapaths 623 and 673 the node 600 is able to retime and packetize into serial data packets, the parallel PCIe data received at 623 that has already been translated from serial 8 lane into 8 lane parallel data. Those packets are then sent across a type of transport at PXC 640. In some cases, it is the packetizing of the now serial data at 623 and unpacketizing at 673 in combination with the programming of the output of the FIC to be a selected number of electric or optical lanes sent to PXC or data transport that provides a reconfigurable PCIe data path transport to remote computing assets.

Also, although clock domains 1-4 are shown in FIG. 6, it is understood that these domains are for an 8 lane PCIe bus 612 example of node 600. Domains 1-4 can change based on changes of the PCX interface optics speed (e.g., changes of the PXC 640 bandwidth) or changes of another data transport's speed; changes in how many lanes of PCIe traffic are on buss 612, connector 684 and/or connector 685; changes in how many lanes there are of parallel data 360, fibers 641 and/or 642.

Upon receiving the optical data from fibers 642, the components of FIC 460 convert the optical data back into multi-lane PCIe data having the same number of lanes, protocol and control signals as the PCIe data that was received by PCIe PHY 621. For instance, upon receiving the optical data from fibers 642, the IO 662, fabric PHY 674, packetizer and fabric datapath 673, optional PCIe/RTL 672 and PCIe PHY 671 of FIC 460 perform the reverse conversions of their counterparts of FIC 450. When the converted data from FIC 460 is received by assets 613 and 614 it will be as if they were connected directly to PCIe bus 612 and the existence of FICs 450 and 460 and of PXC 640 will be transparent to the assets 613 and 614. Thus, FIC 460 is able to send PCIe electronic serial lane data to end-device assets 613 and 614 without those devices knowing that the data was converted by the FICs and transported over the optical switch, such as from a remotely located device 611. Note that RTL 622 and RTL 672 are separately optional such that neither, only one, or both can exist in embodiments.

In addition, similar to cluster 400, node 600 is bidirectional, such as shown by optical fibers 641 and 642; connections to connectors 682 and 683; connections of FIGS. 7-8; and other connections of the FICs 450 and 460 having arrows on both sides. Thus, the FIC 460 (e.g., an iFIC in this case) also converts or retimes PCIe data sent to the PCIe connectors 684 and 685 to retimed parallel version of the PCIe data to be sent on optical fibers 642; and the FIC 450 (e.g., a tFIC in this case) also converts or retimes the parallel version of the PCIe data received from the optical fibers 641 into PCIe data to be sent to the PCIe bus 612. For example, the components of FIC 460 are also able to convert PCIe electronic serial lane data received from 8 lane connectors 684 and 685 from assets 613 and 614 (or functional elements of those resources) to parallel optical data to be transmitted through the four optical fibers 642 to PXC 640 and fibers 641 to FIC 450. When FIC 450 receives this data, it is able to covert the optical data received from fibers 641 back into multi-lane PCIe data having the same number of lanes, protocol and control signals as the PCIe data that was receive by PCIe PHY 671 from the two assets. When the converted data from FIC 450 is received by asset 611 it will be as if they were connected directly to PCIe buses of assets 613 and 614 and the existence of FICs 450 and 460 and of PXC 640 will be transparent to the asset 611. Thus, this conversion can also be done without asset 611 knowing that the data was converted by the FICs and transported over the optical switch, such as from remotely located device assets 613 and 614.

Thus, FIGS. 3-6 describe an architecture of a computing system (e.g., a cluster or node) such as a software defined networking (SDN) based orchestration build-up of a computing system of cloud-scale workload topologies. FIGS. 2-6 describe embodiments of computing systems for PCIe communication between remote computing assets using fabric interface devices such as FICs coupled to receive multi-lane serial PCIe data from functional elements of computing asset through a multi-lane PCIe bus. The FICs may be or have FPGA programmed or configured (e.g., a PCIe to PIPE data transport) to transparently extend the multi-lane PCIe bus by converting the multi-lane PCIe data into a retimed parallel optical version of the PCIe multi-lane data to be sent on a first bidirectional data communication path. The multi-lane PCIe bus may have a certain number of lanes and the first bidirectional data communication path have a different number of lanes. The FICs may be or have FPGA programmed or configured by a fabric manager to convert a certain number of PCIe lanes to a certain number of optical paths, as well as to perform other functions. The programmed FPGA or FIC may be described as a PCIe to PIPE data transport.

The computing system may configure an architecture of a computing node that is able to transparently communicate PCIe data between remote device of a pool of standard PCIe form-factor devices (GPUs, SSD, network or graphic cards), dynamically attached and detached to compute servers seamlessly in bandwidth configurations per cloud workload requirements. To the host OS, each device shows up as if direct locally attached to the host or as if the same devices were passed-through onto virtual machines (VMs) directly. The architecture requires no changes to the device drivers on the host OS or hypervisors. Initialization of the architecture after attach/detach of the pool devices is seamless, without any impact onto other running VMs. The architecture may use fabric interface devices having FPGA based optical transport with help from PXC's to allow seamless reconfigurability. The architecture provides round trip latencies that are extremely low (pipe-tx to pipe-rx) and supports sideband channels that adhere to the peer device handshake needs. In the architecture, the optical transport is protocol independent and optionally supports forward error correction (FEC). The FEC can be implemented on the transport layer (see FIG. 4), which is independent of cyclic redundancy check (CRC) level error-check and recovery between two switch endpoints at the data-link-layer. The architecture could carry other protocols in the future other than PCIe, such as OpenCAPI, CCIX, genZ, etc.

The architecture, cluster and/or systems of FIGS. 3-6 describe an architecture of a computing system that may be updated or reconfigured such as using manager 370 and paths 375 to have different/various numbers of lanes of PCIe data, lanes of data path transport, types (e.g., electrical or optical) of data path transport and different speeds at the clock domains. Thus, these architectures are disaggregated and reconfigurable. Disaggregation allows these architectures to be created in any configuration by coupling the appropriate resources or nodes through the fabric or architecture. Disaggregation allows upgrading or replacing one type of computing asset or nodes without impacting other computing assets or nodes. Thus, these architectures are high throughput, low latency reconfigurable switching fabrics.

Description of Methods

Figure 9:
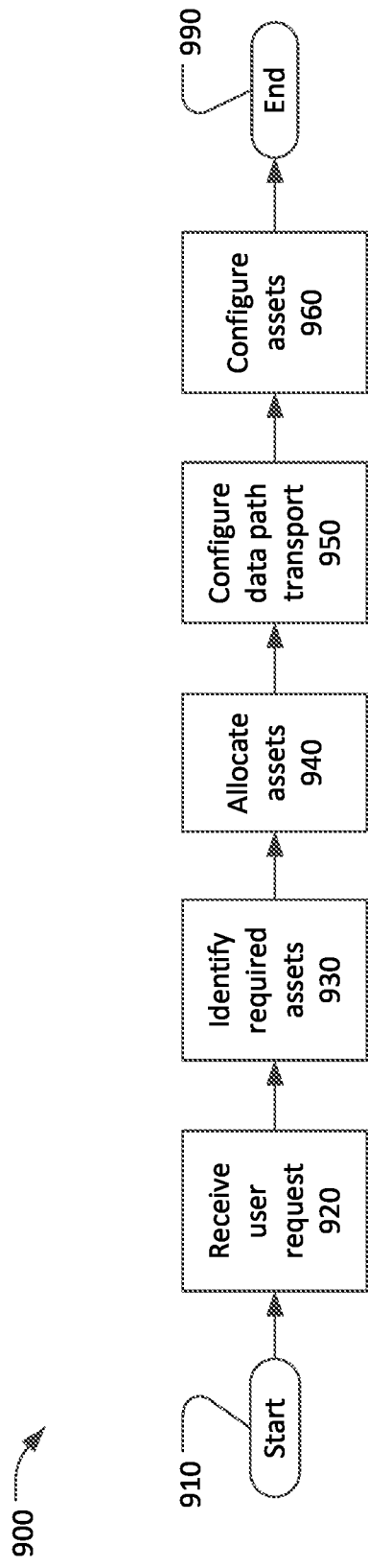
FIG. 9 is a flow chart of a process to configure a compute node.

Referring now to FIG. 9, a process 900 to configure a compute node such as by configuring a computing cluster within a data center starts at 910 and ends at 990. The process 900 may be executed by a fabric manager computing device, such as the fabric manager computing device of any of FIGS. 3-6, which may be within a cloud computing data center. Process 900, au be used to configure or reconfigure a cluster or node, such as of FIGS. 3-6. Since a data center may operate many compute nodes concurrently, multiple instantiations of the process 900 may run concurrently on the same or multiple fabric managers.

The process 900 is initiated when the fabric manager receives, at 920, a user request for a compute node. The user may request a compute node having a specified combination of computing assets. Alternatively, the user may request a compute node for execution of a specified application (which may be provided by the user or by the data center), where the computing assets required to run the specified application are known to the fabric manager.

In either case, at 930, the fabric manager identifies available computing assets for use in the requested compute node. For example, the fabric manager may maintain a list of available computing assets (or a list of all computing assets with a flag indicating whether or not each asset is available) of a computing cluster and simply select the required complement of computing assets from the list. The selected computing assets are then removed from the list of available assets and allocated to the requested compute node. This identifying may include each tFIC discovering all the computing assets and/or functional elements connected to it and publishing a list of them to the fabric manager.

At 940, the architecture of the compute node, including the arrangement of communications paths between the computing assets within the compute node, is determined. In the simplest case, where every computing asset is connected to a data path transport, such as a transport of FIGS. 3-6 by a set of bidirectional communication paths for only certain asset it will communicate data with, the architecture may be a bidirectional network as shown in any of FIGS. 3-6. When all of the computing assets are connected to the data path transport by more than two communications paths such that every computing asset is connected to a data path transport by a set of bidirectional communication paths for each other asset, complex architectures are possible, as shown in FIGS. 3-6. In all cases, the architecture of the compute node should be determined such that desired computing assets pairs are directly connected by fabric interface devices configured to transparently extend multi-lane PCIe buses by converting (e.g., using a PCIe transport) the multi-lane PCIe data into retimed parallel optical version of the PCIe multi-lane data to be sent on bidirectional data communication paths to and from the data path transports. Thus, the desired architecture does not have to consider having the highest inter-asset traffic directly connected or connected though the smallest number of intermediate computing assets, such as for a ring network. Determining the architecture at 940 may also include configuring the fabric interface devices to converting (e.g., using a PCIe transport) the multi-lane PCIe bus data from a first number of lanes to the first bidirectional data communication path having a different second number of lanes. Determining the architecture at 940 may include transparently extending the multi-lane PCIe bus between the computing assets via the FICs, data communications paths and the data path transport without the functional elements of the assets being aware of the fabric interface device or of the data communication paths and without changing the PCIe data or PCIe control signals in the PCIe bus.

The data path transport is configured at 950. To this end, the compute node may send commands to the optical circuit switch to set the appropriate mirrors such that the communications paths defined at 940 are physically realized. The computing assets including the fabric interface devices are configured at 970 by uploading configuration information or software as needed for the computing assets to expected functions in the requested compute node. This uploaded software may include programming code to program FICs and/or FPGAs attached to the computing assets. This programming code may, for example, configure the FPGAs to execute the communications protocol(s) defined at 940. Configuring the optical circuit switch at 960 and configuring the FICs at 960 may be done in either order or concurrently. Once the optical circuit switch and FICs have been configured, the compute node is ready for use by the requestor and the process 900 ends at 990.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, "logic" may be or include hardware and/or software needed to perform the function described for the logic. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computing system comprising:
a first fabric interface device coupled to receive first multi-lane serial peripheral component interconnect express (PCIe) data from first functional elements of a first computing asset through a first multi-lane PCIe bus, wherein the first fabric interface device is configured to transparently extend the first multi-lane PCIe bus by converting the first multi-lane PCIe data into a retimed parallel version of the first PCIe multi-lane data to be sent on a first bidirectional data communication path, wherein the first multi-lane PCIe bus has a first number of lanes and the first bidirectional data communication path has a second number of lanes; and wherein the first number does not equal the second number;
the first computing asset configured to be coupled to a data path transport by the first bidirectional data communication path; and
a second computing asset having second functional elements and configured to be coupled to the data path transport by a second bidirectional data communication path, wherein the second computing asset includes:
a second fabric interface device coupled to receive second multi-lane serial peripheral component interconnect express (PCIe) data from the second functional elements through a second multi-lane PCIe bus, wherein the second fabric interface device is configured to transparently extend the second multi-lane PCIe bus by converting the second multi-lane PCIe data into a second retimed parallel version of the second PCIe multi-lane data to be sent on the second bidirectional data communication path, wherein the second multi-lane PCIe bus has a third number of lanes and the second bidirectional data communication path has a fourth number of lanes; and wherein the third number does not equal the fourth number.

2. The system of claim 1, wherein the first fabric interface device is configured to transparently extend the first multi-lane PCIe bus between the first computing asset and two other computing assets of a first at least three computing assets via a plurality of bidirectional data communications paths and the data path transport by converting the first multi-lane PCIe data into the retimed parallel version of the first PCIe multi-lane data to be sent on the first bidirectional data communication path through the data path transport and to the two other computing assets.

3. The system of claim 2, wherein the first computing asset is connected through the data path transport and the plurality of bidirectional data communication paths to form a bidirectional network having a bidirectional data communication path between each pair of the first and the two other computing assets of the at least three computing assets; and wherein the first fabric interface device is configured to transparently extend the first multi-lane PCIe bus by converting the retimed parallel version of the first PCIe multi-lane data received from the first bidirectional data communication path into the first multi-lane PCIe data to be sent to the first functional elements.

4. The system of claim 3, further comprising a configurable computing cluster comprising:
the data path transport coupled to the first fabric interface device by the first bidirectional data communication path;
the second computing asset coupled to the data path transport by the second bidirectional data communication path; and
the third computing asset having third functional elements and coupled to the data path transport by a third bidirectional data communication path.

5. The system of claim 1, wherein the retimed parallels version of the PCIe multi-lane data has a higher clock domain or frequency than the multi-lane PCIe data; and wherein the first number of lanes is less than the second number of lanes.

6. A computing system comprising:
a first fabric interface device coupled to receive first multi-lane serial peripheral component interconnect express (PCIe) data from first functional elements of a first computing asset through a first multi-lane PCIe bus, wherein the first fabric interface device is configured to transparently extend the first multi-lane PCIe bus by converting the first multi-lane PCIe data into a retimed parallel version of the first PCIe multi-lane data to be sent on a first bidirectional data communication path, wherein the first multi-lane PCIe bus has a first number of lanes and the first bidirectional data communication path has a second number of lanes; wherein the first number does not equal the second number;
wherein the first fabric interface device is configured to transparently extend the first multi-lane PCIe bus between the first computing asset and two other computing assets of a first at least three computing assets via a plurality of bidirectional data communications paths and the data path transport by converting the first multi-lane PCIe data into the retimed parallel version of the first PCIe multi-lane data to be sent on the first bidirectional data communication path through the data path transport and to the two other computing assets;
wherein each of the first at least three computing assets is located in a different computing device from each other of the first at least three computing assets, wherein each functional element performs a function of a central processing unit (CPU), and wherein each functional element includes one of a processor chip, a chip set, a PCIe root controller, or a memory.

7. A computing system comprising:
a first fabric interface device coupled to receive first multi-lane serial peripheral component interconnect express (PCIe) data from first functional elements of a first computing asset through a first multi-lane PCIe bus, wherein the first fabric interface device is configured to transparently extend the first multi-lane PCIe bus by converting the first multi-lane PCIe data into a retimed parallel version of the first PCIe multi-lane data to be sent on a first bidirectional data communication path, wherein the first multi-lane PCIe bus has a first number of lanes and the first bidirectional data communication path has a second number of lanes; wherein the first number does not equal the second number;
wherein the first fabric interface device is configured to transparently extend the first multi-lane PCIe bus between the first computing asset and two other computing assets of a first at least three computing assets via a plurality of bidirectional data communications paths and the data path transport by converting the first multi-lane PCIe data into the retimed parallel version of the first PCIe multi-lane data to be sent on the first bidirectional data communication path through the data path transport and to the two other computing assets; and
wherein transparently extending the first multi-lane PCIe bus comprises transparently extending the first multi-lane PCIe bus between the first at least three computing assets via the data communications paths and the data path transport without functional elements of the first at least three computing assets being aware of the first fabric interface device or of the data communication paths and without changing the PCIe data or PCIe control signals in the PCIe bus.

8. A computing system comprising:
a first fabric interface device coupled to receive first multi-lane serial peripheral component interconnect express (PCIe) data from first functional elements of a first computing asset through a first multi-lane PCIe bus, wherein the first fabric interface device is configured to transparently extend the first multi-lane PCIe bus by converting the first multi-lane PCIe data into a retimed parallel version of the first PCIe multi-lane data to be sent on a first bidirectional data communication path, wherein the first multi-lane PCIe bus has a first number of lanes and the first bidirectional data communication path has a second number of lanes; wherein the first number does not equal the second number; and
wherein the first fabric interface device is configured to transparently extend the first multi-lane PCIe bus between the first computing asset and two other computing assets of a first at least three computing assets via a plurality of bidirectional data communications paths and the data path transport by converting the first multi-lane PCIe data into the retimed parallel version of the first PCIe multi-lane data to be sent on the first bidirectional data communication path through the data path transport and to the two other computing assets; and
a configurable computing cluster comprising:
a fabric manager computing device coupled to the data path transport and the first at least three computing assets, wherein the fabric manager computing device is configured to:
receive a request for a compute node;
select, from the first at least three computing assets, a second at least three computing assets to implement the compute node;
define communications paths between the second at least three computing assets in the compute node;
configure the second at least three computing assets; and
configure the data path transport to communicate the retimed parallel version of the PCIe multi-lane data.

9. A computing system comprising:
a first fabric interface device coupled to receive first multi-lane serial peripheral component interconnect express (PCIe) data from first functional elements of a first computing asset through a first multi-lane PCIe bus, wherein the first fabric interface device is configured to transparently extend the first multi-lane PCIe bus by converting the first multi-lane PCIe data into a retimed parallel version of the first PCIe multi-lane data to be sent on a first bidirectional data communication path, wherein the first multi-lane PCIe bus has a first number of lanes and the first bidirectional data communication path has a second number of lanes; wherein the first number does not equal the second number; and
wherein the first fabric interface device is configured to transparently extend the first multi-lane PCIe bus between the first computing asset and two other computing assets of a first at least three computing assets via a plurality of bidirectional data communications paths and the data path transport by converting the first multi-lane PCIe data into the retimed parallel version of the first PCIe multi-lane data to be sent on the first bidirectional data communication path through the data path transport and to the two other computing assets; and a fabric manager computing device coupled to the data path transport and the first at least three computing assets, wherein the fabric manager computing device is configured to:
  receive a request to execute an application;
  define a compute node required to execute the application;
  select, from the first at least three computing assets, a second at least three computing assets to implement the compute node;
  define communications paths between the second at least three computing assets in the compute node;
  configure the second plurality of computing assets; and
  configure the data path transport to communicate the retimed parallel version of the first PCIe multi-lane data.

10. A reconfigurable computing cluster with remote computing assets, comprising:
  an photonic cross-connect switch;
  three or more bidirectional fiber optic communication paths; and
  a first of at least three computing assets, wherein each of the computing assets is connected to each of the other computing assets through a computer network interface card, wherein each of the first at least three computing assets comprises:
    functional elements, wherein each functional element performs a function of a central processing unit (CPU); and
    a fabric interface device coupled to the functional elements via a multi-lane peripheral component interconnect express (PCIe) bus, wherein the fabric interface device within the first at least three computing assets are configured to transparently extend the multi-lane PCIe bus between computing assets via the fiber optic communications paths and the optical circuit switch by converting PCIe data received from the PCIe bus into a retimed parallel optical version of the PCIe data, and further wherein each of the first at least three computing assets is connected to the optical circuit switch by the three or more bidirectional fiber optic communication paths to form a bidirectional network having a communication path between each pair of the first at least three computing assets.

11. The reconfigurable computing cluster of claim 10, wherein the fabric interface device is a fabric interface card (FIC) having a field programmable gate array (FPGA) that is programmed to retime PCIe data received from the PCIe bus into the retimed parallel optical version of the PCIe data using an electronic first in first out (FIFO) circuit and an electrical to optical serializer/de-serializer (SERDES) circuit.

12. The reconfigurable computing cluster of claim 10, wherein the photonic cross-connect switch has a photonic cross connection directly optically connecting each fabric interface device to each of the other fabric interface devices using a plurality of optical lanes upon which the retimed parallel optical version of the PCIe data is transmitted.

13. The reconfigurable computing cluster of claim 10, wherein being located in a different computing device is at least one of being located in a different computing device chassis, located in a different computing equipment rack or located in a different room.

14. The reconfigurable computing cluster of claim 10, wherein each fabric interface device receives the PCIe data in a first number of PCIe lanes and outputs the retimed parallel optical version of the PCIe data in a second number of optical lanes; wherein the first number does not equal the second number.

15. The reconfigurable computing cluster of claim 10, wherein the first at least three computing assets comprises some or all of central processor unit assets, graphics processor unit assets, application accelerator assets, solid state drive assets, memory assets, storage assets, and network interface assets.

16. The reconfigurable computing cluster of claim 10, further comprising:
  a fabric manager computing device coupled to the optical circuit switch and the first at least three computing assets, wherein the fabric manager computing device is configured to:
    receive a request for a compute node;
    select, from the first at least three computing assets, a second at least three computing assets to implement the compute node;
    define communications paths between the second at least three computing assets in the compute node;
    configure the second at least three computing assets; and
    configure the optical circuit switch to provide the defined communications paths.

17. A method for managing a reconfigurable computing cluster comprising:
  providing a reconfigurable computing cluster, comprising a data path transport, at least four computing assets, and two or more bidirectional data communication paths coupled to each computing asset, wherein each of the first plurality of computing assets comprises functional elements, and a fabric interface device coupled to the functional elements via a multi-lane peripheral component interconnect express (PCIe) bus, wherein the fabric interface devices within the at least four computing assets are configured to transparently extend the multi-lane PCIe bus by converting the multi-lane PCIe data into a retimed parallel version of the PCIe multi-lane data to be sent on the data communications paths, and further wherein each of the at least four computing assets is connected to the data path transport to form a bidirectional network having a data communication path between each pair of the at least four computing assets;
  receiving a request for a compute node;
  selecting, from the at least four computing assets, three computing assets to implement the compute node;
  defining a defined data communications path between each pair of the three computing assets to implement the compute node;
  the data communication paths connecting each of the three computing assets to each of the other of the three computing assets; and
  configuring the data path transport to provide the defined data communications paths between each pair of the three computing assets.

18. The method of claim 17, wherein converting the multi-lane PCIe data into a retimed parallel version of the PCIe multi-lane data includes changing a first number of lanes of the multi-lane PCIe bus PCIe electronic data to a different number of lanes of the retimed parallel version of the PCIe multi-lane data for transmission on the bidirectional data communication paths.

19. The method of claim 18, wherein receiving a request for a compute node comprises:
- receiving a request to execute an application; and
- defining a compute node required to execute the application.

20. The method of claim 19, further comprising changing the different number of lanes of the retimed parallel version of the PCIe multi-lane data into optical data; wherein:
- each asset is one of: a CPU asset, a network interface asset, a GPU asset, a memory asset, or a solid state drive asset;
- each data communication path is a bidirectional optical fiber;
- the data path transport protocol is a photonic cross-connect switch; and
- transparently extending the multi-lane PCIe bus comprises transparently extending the multi-lane PCIe bus between each computing assets via the data communications paths and the data path transport without any of the functional elements being aware of the fabric interface device or of the data communication paths and without changing the PCIe data or changing PCIe control signals in the PCIe bus.

\* \* \* \* \*